United States Patent
Vexelman et al.

[11] 3,964,303
[45] June 22, 1976

[54] TIRE WEAR MEASURING ARRANGEMENT

[76] Inventors: Ilya Volfovich Vexelman, ulitsa Kubinka, 5, korpus 2, kv. 192; Leonid Davydovich Sljudikov, ulitsa Bazhova, 15, korpus 2, kv. 167; Alexandr Grigorievich Kutilin, ulitsa Sharikopodshipnikovskaya, 36/18, kv. 306; Oleg Mikhailovich Kalugin, 2 Novoostankinskaya ulitsa, 2, kv. 10, all of Moscow, U.S.S.R.

[22] Filed: Sept. 10, 1973

[21] Appl. No.: 396,126

[52] U.S. Cl. .................................. 73/146; 33/203; 33/203.19
[51] Int. Cl.² ...................... G01B 5/08; G01B 5/20; G01M 17/02
[58] Field of Search .............. 73/8, 81, 82, 83, 146; 356/72; 33/203, 203.11, 203.18, 203.19, 189, 203.13, 203.16

[56] References Cited
UNITED STATES PATENTS

| | | | |
|---|---|---|---|
| 451,053 | 4/1891 | Jackman | 33/203 |
| 1,424,941 | 8/1922 | Pirwitz | 33/189 |
| 2,325,362 | 7/1943 | Black, Sr. | 33/203.19 X |
| 2,566,407 | 9/1951 | Evans | 33/203 X |
| 2,566,435 | 9/1951 | Trimmer | 33/203 X |
| 3,269,019 | 8/1966 | Krohn | 33/203.11 X |
| 3,423,839 | 1/1969 | Liskey | 33/203 X |
| 3,518,878 | 7/1970 | Landsness et al. | 73/146 |

*Primary Examiner*—S. Clement Swisher
*Assistant Examiner*—John S. Appleman
*Attorney, Agent, or Firm*—Haseltine, Lake & Waters

[57] ABSTRACT

A tire wear measuring arrangement incorporates a measuring device adapted to be brought to the tire tread under test. The measuring device and an optical view-finder are so mounted on a swivel carrier that the measuring axis is arranged parallel to the optical axis and both axes are spaced equidistantly from the axis of rotation of the carrier.

4 Claims, 1 Drawing Figure

U.S. Patent June 22, 1976  3,964,303
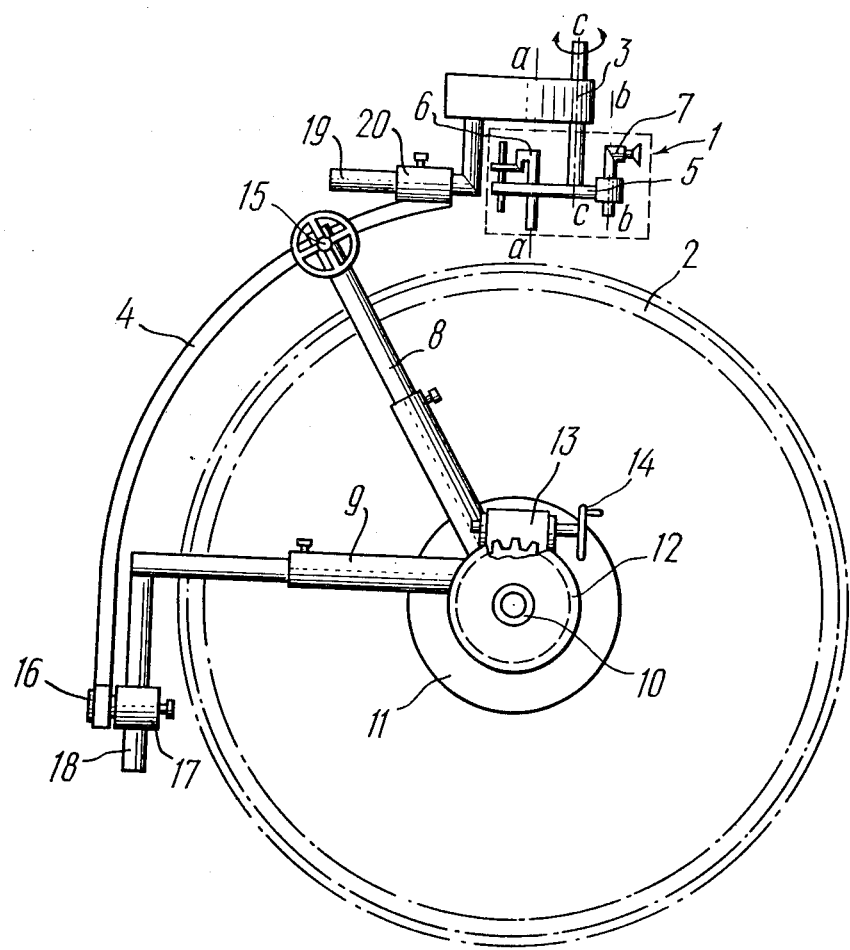

TIRE WEAR MEASURING ARRANGEMENT

The present invention relates to the tyre industry equipment, and has particular reference to tyre wear measurers.

The invention can find most utility when applied for measuring the degree of wear of the tread pattern of automobile tyres. Besides, the invention is likewise applicable for tyre testing aimed at the assessment of tyre wear resistance or the influence of diverse factors upon the wear process, and also for operatively monitoring the degree of tyre wear in the course of service life thereof.

At present the most extensive application has found the measurement of the degree of tyre wear with the use of a depth gauge.

According to the technique in common use, there is measured manually, by a depth gauge, the depth of the tyre tread groove, whereupon the degree of the tyre wear is judged by the amount by which the tread depth has been reduced. However, no sooner does the depth-gauge method enable one to reliably measure the degree of tyre wear than after a run of 15 to 20 thousand kilometers. Besides, the measuring accuracy of the depth gauge is as low as ±0.4 mm. The basic causes of low-accuracy tread wear measurements with the use of a depth gauge are as follows: absence of fixed measuring points; difficulties encountered in setting the depth gauge exactly normal to the tread pattern; different strain ratios of rubber resulting from the effect of the depth gauge.

One more tyre wear measurer is known to use currently, based upon the effect of radiation absorption.

Said known measurer comprises radioactive sources made on the base of the radioactive isotope of thallium and fashioned as a metallic wire 0.3 mm in diameter, and a radiation dosimeter. The test procedure consists in that radioactive sources are introduced, by means of a medical syringe, into diverse spots of the tyre tread for a depth of 1.5 mm, the radiation activity is measured with the dosimeter and the degree of wear of the tyre ply above the radioactive source is judged by the dosimeter readings. The afore-discussed tyre tester is distinguished for rather high measuring accuracy ranging within ±0.01 mm. However, the device failed to gain extensive use due to the fact that radioactive sources need special rules to handle them which are difficult-to-observe under tyre testing conditions and also owing to that the test equipment is too complicated and cumbersome, while the test results are hard-to-process.

The weight method of tyre-wear measurement has found extensive application in the up-to-date practice throughout the world. Before being subjected to road testing the tyre is carefully cleaned of dirt, washed, held in a cabined drier and weighed. After road test run the tyre is cleaned of dirt, washed, dried and weighed again. The difference in the tyre weight is in fact the index of the degree of wear thereof. The disadvantages inherent in the weight method of tyre-wear measurement are as follows: involvement of expensive equipment for careful cleaning, washing and drying of tyres; high labour consumption; possibility of finding only the integral wear of the tyre tread; and impossibility to obtain a topographic picture of wear distribution over the entire tread-pattern surface or of wear at a desired tyre point.

Besides, still another tyre wear measurer is now known to be in current use. The known measurer comprises a carrier mounting a measuring device which is adapted to be brought to the tyre tread under test by means of an electric drive mounted on a bracket, the latter being connected to the hub made fast on the tyre under test. The hub has a swivel contrivance, while the measuring device is made as an indicator which is spring-mounted on a stem. The indicator rod is connected to the measuring spindle which freely moves in the carrier.

The measuring procedure consists in the following. The tyre is positioned, by means of the swivel and rack-and-pinion devices, under the measuring spindle with the spot to be measured. Then the measuring device is actuated by the electric drive to approach to the tyre until its measuring spindles get in contact with the tyre surface, whereupon the tread depth is determined against the indicator. The amount of the tyre wear is determined as the difference of the readings taken before and after tyre road test.

A disadvantage inherent in said known tyre-wear measuring arrangement resides in the necessity for the tyre to be dismantled from the automobile whenever it has to be measured for degree of wear, said procedure being highly laborious one, especially in case of cargo-truck tyres.

Another disadvantage of said arrangement lies with its inadequately high measuring accuracy, this being due to the fact that the measuring device is brought to the desired spot of the tyre tread by rule of thumb, without using any centring devices.

A further disadvantage of said known arrangement is impossibility to measure with the same arrangement the wear of tyres differing in the outside diameter and the tread radius, which is the case for, say, the tyres of passenger cars and cargo trucks.

It is therefore a primary object of the present invention to provide a versatile tyre wear measuring arrangement which enables the measurement of the wear of tyres having various diameters and tread radii.

It is another object of the present invention to increase the measuring accuracy of the degree of wear on tyre tread.

It is still another object of the present invention to provide a tyre wear measuring arrangement simple in design and distinguished for high efficiency, i.e., enabling a great number of tyres to be measured directly under conditions of routine operation thereof.

In accordance with the aforesaid and other objects the essence of the present invention resides in that in a tyre wear measuring arrangement, comprising a measuring device adapted to be brought to the tyre tread under test, according to the invention said measuring device is mounted on a swivel carrier which also mounts an optical view-finder, in such a position that the measuring axis is parallel to the optical axis and both axes are spaced equidistantly from the axis of rotation of the carrier.

The aforesaid arrangement features high measuring accuracy, viz., 0.01 mm which is attainable due to the fact that the optical view-finder enables the measuring device to be set, in a series of consecutive measurements, exactly at the same preset points of the tyre tread.

It is desirable that the swivel carrier be cantilever-mounted on a yoke which embraces the tyre being measured along its outside diameter and is provided with a means enabling it to travel along the tyre outside diameter and with a means for its travelling in the direction parallel to the tyre axis.

It is recommended that the means for the yoke to travel along the tyre outside diameter be made of two stems connected with one of their ends to the yoke, while the other ends are held to the shaft rotatably mounted with respect to the wheel hub.

Such a kinematic association enables the measuring device to travel within the entire zone of the tyre tread, due allowance being made therein for an adequate rigidity of the entire arrangement which is of importance for attaining high measuring accuracy thereof. Besides, the measuring device can thereby be easily brought close to the desired point of the tyre tread, while the whole arrangement for tyre measurement is made packaged and light in weight, thus becoming suitable for measuring the tread wear immediately on the automobile.

It is expedient that each of said stems be made telescopic.

Application of the telescopic stems has made the arrangement versatile, i.e., suitable for measuring the degree of wear on tyres of a diversity of diameters and tread radii, being therefore applicable for such measurements in the tyres of both passenger cars and cargo trucks.

Other objects and advantageous features of the invention will become more evident from the following specific exemplary embodiment thereof to be taken in conjunction with the accompanying drawing, wherein a schematic view of a tyre wear measuring arrangement is represented according to the present invention.

Now referring to the accompanying drawing, the tyre wear measuring arrangement comprises a measuring device 1 adapted to be brought to a tyre tread 2 by means of a drive 3 which is held to a yoke 4. The tyre 2 being measured is in its normal position on the automobile, however, the tyre 2 can also be mounted on a special stand (not shown in the FIGURE). The measuring device 1 is made as a turret head whose swivel carrier 5 mounts an indicating instrument, say, a spring-mounted indicator 6, and an optical view-finder 7 so that a measuring axis $a$—$a$ is parallel to an optical axis $b$—$b$ and both axes are spaced equidistantly from an axis $c$—$c$ of rotation of the carrier 5. The carrier 5 is cantilever-mounted on the yoke 4 through the drive 3. The yoke 4 embraces the tyre 2 being measured along the outside diameter thereof and is provided with a means for its travel along the outside diameter of the tyre 2. Said means is made of two telescopic stems 8 and 9 whose one ends are articulated to the yoke 4, while their other ends are held to a shaft 10 which is rotatably mounted with respect to a wheel hub 11. A worm wheel 12 is slipped over the shaft 10. The hub 11 is held by nuts (not shown) to the wheel rim (not shown). When a worm 13 is rotated by means of a handwheel 14 the worm wheel 12 together with the shaft 10 and the stems 8 and 9 rotates accordingly with respect to the outside diameter of the tyre 2 through a preset angle. The end of the stem 8 located closer to the measuring device 1, is connected to the yoke 4 through a screw 15, while the end of the stem 9 is connected to the yoke 4 by means of a hinge joint 16. Such a kinematic association of the ends of the stems 8 and 9 with the yoke 4 enables the latter to travel in the direction parallel to the axis of the tyre 2. When measuring the tyre 2 of another diameter, the relative position of the hinge joint 16 and the stem 9 must be changed, as well as that of the measuring device 1 and the stem 8. To this end, the hinge joint 16 is mounted on a sleeve 17 traversable along a guideway 18 locked-in with the stem 9, while the measuring device 1 is connected to a guideway 19 movable in a sleeve 20 made fast on the yoke 4.

The tyre wear measuring arrangement operates as follows.

The length of the telescopic stems 8 and 9 is set to suit the size of the tyre to be measured and the type of the tyre (the passenger-car or cargo truck one), while the position of the sleeves 17 and 20 is so set as to define a clearance of 1 to 2 cm between the yoke 4 and the tread of the tyre 2. A turn of the handwheel 14 imparts rotation to the worm gear composed of the worm 13 and the worm wheel 12. The latter together with the shaft 10 and the stems 8 and 9 moves the measuring device 1 along the outside diameter or along the tread of the tyre 2 being measured, towards the spot to be measured. Further, rotation of the screw 15 causes the measuring device 1 to travel across the tyre tread towards the point to be measured on the tread of the tyre 2. Then, looking through the optical viewfinder 7, one must attempt such a position as to aim at the measuring point marked out in the tread groove of the tyre 2 and bring it to the cross-hairs of the optical viewfinder 7. Thereupon, by rotating the carrier 5, one should set the indicator 6 in place of the viewfinder 7 and, by means of the drive 3, lower the indicator 6 till it gets in contact with the tyre 2, whereupon measurement is taken. After having been subjected to road test the tyre 2 is measured at the same point and the difference between the indicator readings is adopted as the amount of tyre wear at the specified point.

The tyre wear measuring arrangement proposed in the present invention ensures high measuring accuracy of tyre wear at any preset point of the tread thereof. Wear measurement is taken directly on the tyre mounted on the automobile which much reduces time spent for wear measurement procedure. Simple design and high efficiency of the arrangement enable it to be used for monitoring a great many of tyres under routine operating conditions. Time taken by measuring a tyre equals 10 to 15 min.

The principal advantage of the arrangement, viz., high measuring accuracy amounting to 0.01 mm, is attainable due to an exact location of the measuring device with respect to the tyre being measured. The present tyre wear measuring arrangement makes it possible to measure the amount of wear as early as upon a 500–1000 km run. The possibility of taking measurements of tyre wear at any point of the tread thereof enables the wear topography to be duly studied, which is of special importance in developing improved tyre design.

Besides, an accurate determining of the amount of tyre wear resulting from a short run renders it possible to rapidly locate troubles in the front-wheel suspension which affect the nonuniform wear on the tread pattern.

Economic effect from the application of the present arrangement may be obtained first due to considerably reduced terms of road testing and second, in case of using special tyre rotation patterns.

High cost of road testing procedure is accounted for by a necessity of a long test run of ballast-loaded automobiles (up to 40 or 50 thousand kilometers), since the previously-available arrangements were not capable of measuring tyre wear until a long run had been made. The use of the proposed arrangement enables wear measurement to be performed even after a short run of the automobile and thereby makes possible a 5–10 fold reduction of the time spent for an accelerated testing accompanied by a corresponding reduction of the test expenses. Moreover, as experience gained has shown, in case of using special tyre rotation patterns the proposed arrangement makes it possible to completely dispense with the conducting special short-run testing under road conditions and thus assess tyre wear-resisting properties directly on automobiles engaged in routine cargo-shipment operations, with the result that the wear-resistance assessment costs are 100 times reduced as compared to costs of the short-run road tests of tyres mounted on ballast-loaded automobiles. A possibility for the user to select the best tyres of the products available from a variety of manufacturers adds likewise much to saving expenses.

Of great consideration for determining the economical effect are the reduced terms of developing new tyre designs and tread-rubber formulations which is attained due to reduced time spent for wear-resistance assessment. Thus, the capabilities of designers and technologists are much extended in the field of developing a variety of factors, since the wear-resistance assessment with the use of the proposed arrangement needs but minimum time and expenses to be spent.

Revealing a nonuniform wear on tread patterns at the early stage of tyre service life enables finding out the cause of such an uneven wear (i.e., troubles in the automobile suspension gear, incorrect camber or toe-in of the front wheels, excess free play in the steering gear, etc.) and, thereby, attaining a longer service life of tyres and the automobile as a whole.

Timely trouble detection in automobile suspension gears causing abnormally-rapid uneven tyre wear and possibility of operatively eliminating such troubles, will enable the firms engaged in automobile maintenance practice to provide for more complete services to their clients.

What is claimed is:

1. A tyre wear measuring arrangement, incorporating: a measuring device adapted to be brought to the tyre tread being measured for measuring the distance from the tyre circmferential surface to the center axis of the tyre; an optical view-finder for locating a point on said tyre circumference; a swivel carrier; means mounting said swivel carrier at a predetermined radial distance relative to the center axis of said tyre, said measuring device and said optical view-finder being mounted on said swivel carrier so that the measuring axis is parallel to and in spaced relationship with the optical axis and both axes are spaced equidistantly from the axis of rotation of said carrier, said optical view-finder and said measuring device adapted to be pivoted about said axis of rotation after location of said point by said view-finder so as to position said measuring device above said point and said measuring device being axially displaceable towards and into contact with the said tyre for measurement thereof.

2. An arrangement as claimed in claim 1, incorporating: a yoke embracing said tyre being measured along the circumference thereof; said yoke carrying the cantilever-mounted said swivel carrier; a means with which said yoke is provided for being traversed along the circumference of said tyre; a means with which said yoke is provided for being traversed in the direction parallel to the axis of said tyre.

3. An arrangement as claimed in claim 2, wherein said means for said yoke to traverse along the circumference of said tyre comprises: a hub; a shaft rotatably mounted in said hub; two stems; one of the ends of said stems connected to said yoke; the other ends of said stems held to said shaft.

4. An arrangement as claimed in claim 3, wherein said stems are made telescopic.

* * * * *